United States Patent
Pham

(10) Patent No.: US 9,644,657 B2
(45) Date of Patent: May 9, 2017

(54) FASTENING DEVICE

(71) Applicant: LISI AEROSPACE, Paris (FR)

(72) Inventor: Charles Pham, Sevran (FR)

(73) Assignee: LISI AEROSPACE, Paris (FR)

(*) Notice: Subject to any disclaimer, the term of this patent is extended or adjusted under 35 U.S.C. 154(b) by 9 days.

(21) Appl. No.: 14/013,877

(22) Filed: Aug. 29, 2013

(65) Prior Publication Data

US 2014/0072385 A1    Mar. 13, 2014

(30) Foreign Application Priority Data

Sep. 13, 2012 (FR) ...................... 12 58612

(51) Int. Cl.
| | |
|---|---|
| F16B 19/02 | (2006.01) |
| F16B 5/02 | (2006.01) |
| F16B 13/06 | (2006.01) |
| B23P 11/00 | (2006.01) |
| F16B 5/04 | (2006.01) |
| F16B 19/00 | (2006.01) |
| F16B 43/00 | (2006.01) |

(52) U.S. Cl.
CPC ............ *F16B 13/063* (2013.01); *B23P 11/00* (2013.01); *F16B 5/02* (2013.01); *F16B 5/04* (2013.01); *F16B 19/008* (2013.01); *F16B 19/02* (2013.01); *F16B 43/001* (2013.01); *Y10T 29/49885* (2015.01)

(58) Field of Classification Search
CPC .................................. F16B 5/02; F16B 5/0258
USPC ........................................................ 411/69
See application file for complete search history.

(56) References Cited

U.S. PATENT DOCUMENTS

| | | | |
|---|---|---|---|
| 2,884,099 A | 4/1959 | Nenzell | |
| 3,136,203 A | 6/1964 | Davis | |
| 3,298,725 A | 1/1967 | Boteler | |
| 3,469,490 A | 9/1969 | Pearce | |
| 3,711,347 A | 1/1973 | Wagner et al. | |
| 4,164,807 A * | 8/1979 | King, Jr. .......................... | 29/523 |
| 4,244,661 A * | 1/1981 | Dervy ............................ | 403/243 |
| 4,405,256 A * | 9/1983 | King, Jr. .................... | 403/408.1 |
| 4,521,147 A * | 6/1985 | King et al. ...................... | 411/43 |
| 4,789,283 A * | 12/1988 | Crawford ......................... | 411/43 |

(Continued)

FOREIGN PATENT DOCUMENTS

| | | |
|---|---|---|
| FR | 2871861 A1 | 12/2005 |
| WO | WO 2010/142901 | 12/2010 |

OTHER PUBLICATIONS

Fritzen, Claas, Europe Search Report (French language), EP Application 13182760.2, Nov. 29, 2013, 6 pages.

*Primary Examiner* — Flemming Saether
(74) *Attorney, Agent, or Firm* — Henricks, Slavin & Holmes LLP

(57) ABSTRACT

The invention relates to a fastening device (100) comprising:
  a bolt (107) with a head (108) and a shaft (109);
  a sleeve (111) comprising a head (112) able to house the head of the bolt and a body (113) able to house the bolt shaft, the sleeve body having an inner diameter smaller than the bolt shaft diameter;
  a ring (116) in solid and compressible material, attached to an outer surface (115) of the sleeve body and positioned near the sleeve head,
  said outer surface being able to contact a wall (106) of a drilled hole (103) made in a structural component, said ring being able to be compressed between said outer surface and said wall.

11 Claims, 2 Drawing Sheets

(56) References Cited

U.S. PATENT DOCUMENTS

| | | | |
|---|---|---|---|
| 5,129,253 A * | 7/1992 | Austin et al. | 72/370.07 |
| 8,322,958 B2 * | 12/2012 | Haylock et al. | 411/69 |
| 2010/0124472 A1 * | 5/2010 | Nguyen et al. | 411/337 |
| 2012/0237289 A1 | 9/2012 | Guerin | |

* cited by examiner

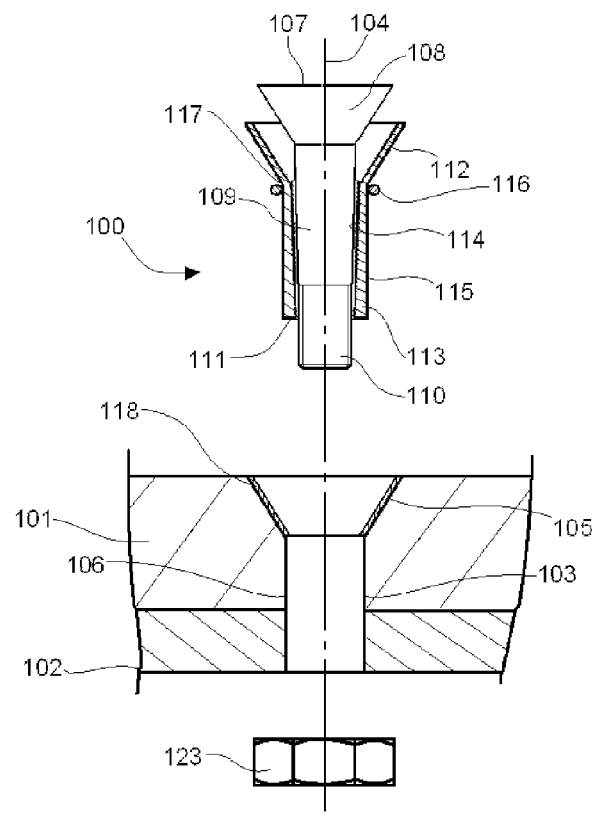
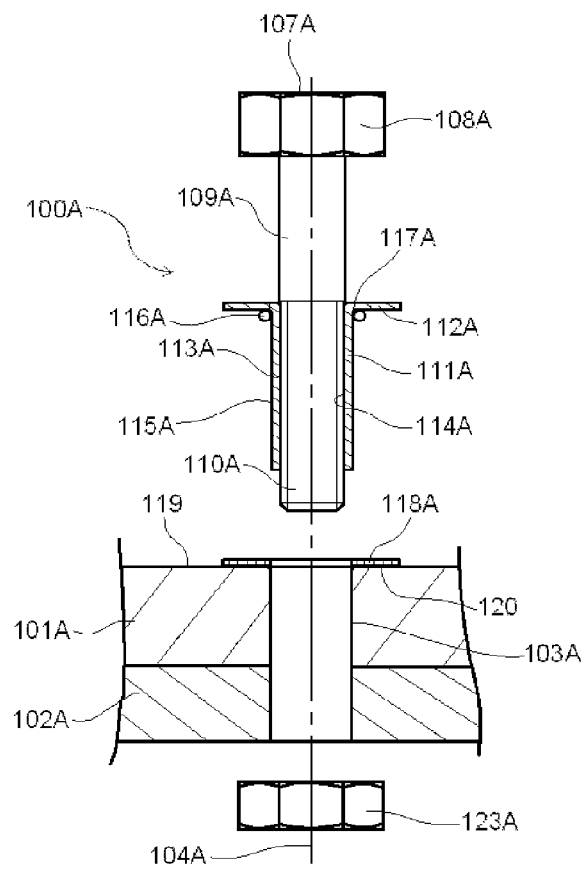
Fig. 1
Fig. 2

FASTENING DEVICE

BACKGROUND

This invention concerns a fastening device. The invention applies more particularly, but not exclusively, to the field of aeronautics.

Related Art

A fastening device is known from the prior art, designed for an interference fit with a structure, comprising a screw extending along an axis and comprising a head and a shaft, as well as a sleeve extending along the screw axis and comprising a housing for the screw shaft and a head blocking the translational movement of the sleeve along the screw axis when the sleeve is in place in a drilled hole. An interference fit is a negative-clearance fit. In the aforementioned prior art, the screw shaft has an outer diameter larger than the inner diameter of the sleeve that will house it, which causes sufficient radial expansion of the sleeve within the drilled hole while the screw is being installed in order to prevent any translational movement by the fastening device expanded within the drilled hole. This type of fastening device is, for example, described in WO 2010/142901.

Such a fastening device is conventionally attached to a structural component comprising a drilled hole running along the screw axis. However, the sleeve and drilled hole are generally configured so that a gap is formed between an under-head radius of the sleeve and an inlet radius of the drilled hole. Such a gap ensures that the head of the sleeve fits completely on the structure.

The prior art recommends applying a layer of fresh sealant on a part of the structural component designed to be in contact with the underside of the sleeve head, so as to ensure leak tightness (with respect to water or fuel, for instance) once the sealant is dry.

However, during the step in which the sleeve is inserted into the drilled hole, fresh sealant may get into the gap formed between the under-head radius of the sleeve and the inlet radius of the drilled hole. When the screw is inserted into the sleeve and the under-head radius of the sleeve expands radially, the sealant is expelled from the gap into the drilled hole, and spreads around the sleeve body.

Fresh sealant around the sleeve body is particularly problematic because a lubricant film forms between the sleeve body and the drilled hole, affecting the adhesion between the sleeve and the drilled hole. However, if the adhesion between the screw and the sleeve becomes greater than the adhesion between the sleeve and the drilled hole, the sleeve is driven by the screw and lengthens as the screw is inserted.

Such an elongation of the sleeve can, for example, cause thinning and weakening of the sleeve under-head area, but also incomplete radial expansion of the sleeve and thus less interference between the sleeve and drilled hole. The presence of sealant around the sleeve body therefore significantly affects the quality of the fit, particularly in terms of mechanical strength.

Thus there is a need to prevent the layer of fresh sealant from spreading around the sleeve body.

One aspect of this invention solves this technical problem.

SUMMARY

More specifically, the invention relates to a fastening device comprising a bolt extending along an axis and comprising a head and a shaft; a sleeve extending along the axis of the bolt and comprising a head able to house the bolt head and a body able to house the bolt shaft, the sleeve body having an inner diameter smaller than the bolt shaft diameter so as to provide a negative clearance between the sleeve and the shaft; a ring of solid, compressible material, joined to an outer surface of the sleeve body and disposed near the sleeve head, said outer surface being able to contact a wall of a drilled hole made in a structural component, said ring being able to be compressed between said outer surface and said wall.

The ring is preferably made of a material comprising an acrylic polymer.

The ring is even more preferably made of a material also comprising mica.

The ring is preferably placed around a sleeve under-head radius.

The bolt is preferably a screw or a rivet comprising a pulling shaft.

A further subject matter of the invention is method for manufacturing a device as described above, comprising a step in which a bead of polymer material, in a liquid or viscous state, is applied to the outer surface of the sleeve, and then polymerized to solidify said material in a ring shape.

A further subject matter of the invention is a method for assembling a fastening device as described above to a structural component, said component comprising a drilled hole, said hole having a wall able to house the body of the sleeve with clearance. This method comprises a step in which a layer of a viscous or fluid composition is applied to a part of the structural component designed to come into contact with the sleeve head; a step of inserting the sleeve into the drilled hole of the structural component along the axis of the screw, so that the ring is compressed against the wall of the drilled hole; and then a step of inserting the bolt into the sleeve along the axis of the bolt so that the sleeve expands radially within the drilled hole and the ring is compressed between the outside surface of the sleeve body and the wall of the drilled hole.

A further subject matter of the invention is an assembly of a fastening device and assembly joining component, said assembly being the result of a method as described above.

BRIEF DESCRIPTION OF THE DRAWINGS

The invention will be better understood upon reading the following description and examining the accompanying figures, which are presented for information purposes and do not limit the invention. The figures illustrate the following:

FIG. 1: a cross-sectional, exploded, schematic view of a fastening device and two structural components before assembly, according to one embodiment of the invention;

FIG. 2: a cross-sectional, exploded, schematic view of a fastening device and two structural components before assembly, according to another embodiment of the invention;

DETAILED DESCRIPTION

Figure 3:
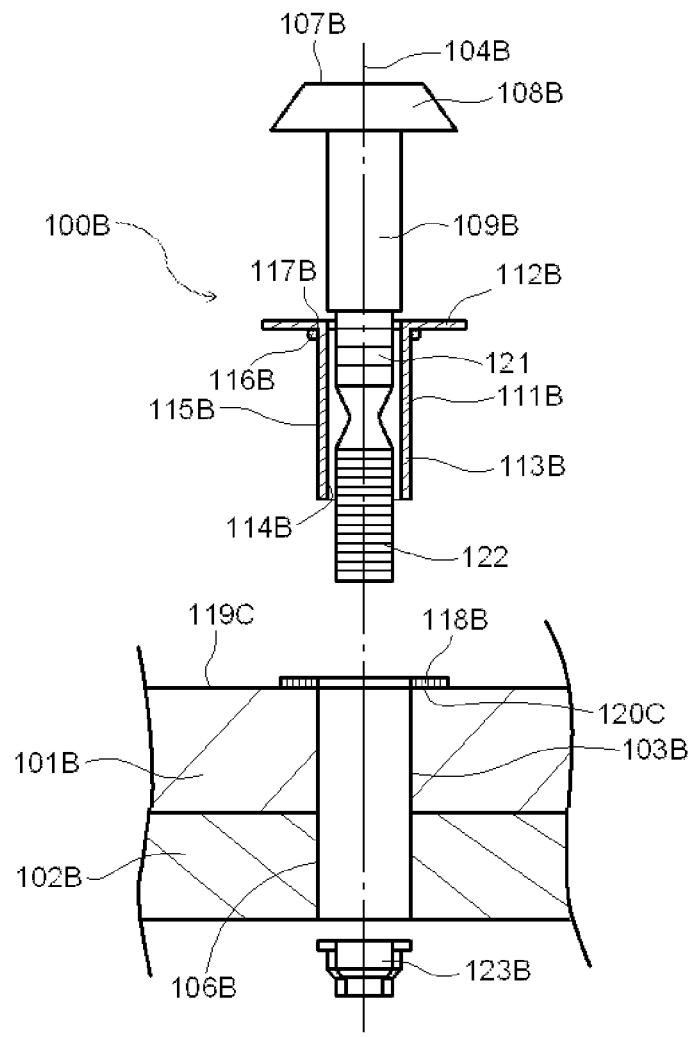
FIG. 3: a cross-sectional, exploded, schematic view of a fastening device and two structural components before assembly, according to another embodiment of the invention.

FIG. 1 shows a schematic view of a fastening device 100, a first structural component 101 and a second structural component 102 according to one embodiment of the invention.

The structural components (101 and 102) comprise a drilled hole 103 located along an axis 104. In the example shown in FIG. 1, the drilled hole 103 comprises a countersink 105 and cylindrical wall 106 through the first and second structural components (101 and 102).

Fastening device 100 comprises a screw 107 extending along axis 104. Screw 107 has a countersunk head 108, tapered shaft 109 and threaded part 110 opposite the head 112.

Fastening device 100 also comprises a sleeve 111 extending along axis 104. Sleeve 111 can be inserted into the drilled hole 103.

Sleeve 111 comprises a head 112 able to house the head 108 of the screw 107. In the example shown in FIG. 1, head 112 of sleeve 111 is countersunk.

In addition, sleeve 111 comprises a body 113 able to house the shaft 109 of screw 107. An inner surface 114 of body 113 of sleeve 111 is substantially complementary in shape to shaft 109 of screw 107. Thus, in the example shown in FIG. 1, the inner surface 114 of body 113 has a tapered shape. An outer surface 115 of body 113 of sleeve 111 is appreciably complementary in shape to the wall 106 of drilled hole 103. Thus, in the example shown in FIG. 1, the outer surface 115 of body 113 is cylindrical.

Fastening device 100 is intended to be interference-fitted in the structural components (101 and 102). In the example shown in FIG. 1, the interference fit is performed as follows. Shaft 109 of screw 107 has, at the same height along axis 104, a larger diameter than the diameter of the inner surface 114 of body 113 of sleeve 111, so that the insertion of screw 107 into sleeve 111 causes a radial expansion of said sleeve. A diameter of the outer surface 115 of sleeve 111 is, before insertion of screw 107, smaller than the diameter of drilled hole 103, so that sleeve 111 is inserted into drilled hole 103 with a positive clearance. Finally, the insertion of the shaft 109 of screw 107 into sleeve 111 causes expansion of the outside diameter of said sleeve so as to immobilize the fastening device 100 along axis 104.

Fastening device 100 further comprises a ring 116 made of solid, compressible material. Ring 116 is joined to the outer surface 115 of the body 113 of sleeve 111. Ring 116 is close to head 112 of sleeve 111. Preferably, ring 116 is positioned at the under-head radius 117 of sleeve 111, i.e. at the intersection between head 112 and body 113 of sleeve 111. Ring 116 is configured so as to be compressed against the cylindrical wall 106 of the drilled hole 103.

Countersink 105 of drilled hole 103 is coated with a layer 118 of a composition in viscous or liquid state before fastening device 100 is installed in drilled hole 103. The composition in the viscous or liquid state is, for example, fresh sealant. The layer 118 of fresh sealant is preferably applied to the entire periphery of the countersink 105 so as to make the fastening device 100 assembly as well as the first and second structural components (101 and 102) leaktight.

FIG. 2 shows another embodiment of the invention in which similar components retain the same references with the letter A added. Features shared with the embodiment of FIG. 1 will not be covered again in the following description.

FIG. 2 shows a schematic view of fastening device 100A, and the first and second structural components (101A and 102A) comprising a drilled hole 103A. In the example shown in FIG. 2, wall 103A is cylindrical.

Screw 107A of fastening device 100A comprises a protruding cylindrical head 108A, a cylindrical-shaped shaft 109A and a threaded part on the opposite side of head 108A.

Sleeve 111A of fastening device 100A has a head 112A and a body 113A whose internal surface 114A and external surface 115A are cylindrical.

Alternatively to the examples of FIGS. 1 and 2, the walls 106, 106A are tapered, and the outer surfaces 115, 115A of bodies 113, 113A are also tapered, with the same rate of taper.

The diameter of shaft 109A of screw 107A is larger than the diameter of the inner surface 114A of body 113A of sleeve 111A. The diameter of the outer surface 115A of body 113A of sleeve 111A is smaller than the diameter of drilled hole 103A, before inserting screw 107A into sleeve 111A. Thus, the fastening device 100A enables an interference fit within the structural components (101A and 102A).

Head 112A of sleeve 111A is a substantially flat flange placed substantially perpendicular to axis 104A of screw 107A. When fastening device 100A is assembled onto the first and second structural components (101A and 102A), the flange 112A is caught between a surface 119 of the first structural component 101A of screw 107 and the head 108A of screw 107A.

An area of contact 120 between flange 112A and surface 119 of the first structural component 101A is coated with a layer 118A of fresh sealant. The layer 118A of fresh sealant is preferably applied to the entire periphery of contact area 120 of flange 108A so as to make the fastening device 100A assembly as well as the first and second structural components (101A and 102A) leaktight.

Ring 116A is positioned at radius 117A under the head of the sleeve 111A on the outer surface 115A of body 113A of sleeve 111A.

FIG. 3 shows another embodiment of the invention in which similar components to FIGS. 1 and 2 have the same part numbers to which the letter B is added, and the components similar to FIG. 2 only retain the same part numbers to which the letter C is added. Features shared with the embodiments of FIGS. 1 and 2 will not be covered again in the following description.

FIG. 3 shows a schematic view of fastening device 100B, and the first and second structural components (101B and 102B) including a drilled hole 103B. In the example shown in FIG. 3, drilled hole 103B has a cylindrical wall 106B.

Fastening device 100B comprises a rivet 107B with a protruding head 108B, a cylindrical shaft 109B, an locking part 121 and a pull stem 122. Pull stem 122 is located opposite the head 108B of rivet 107B, and the locking part 121 is located between shaft 109B and a pull stem 122. In the example shown in FIG. 3, the locking part 121 is in the form of swaging grooves.

Sleeve 111B of fastening device 100B is similar to sleeve 111A illustrated in FIG. 2. Sleeve 111B has a flange-shaped head and a body 113B whose inner and outer surfaces (114B and 115B) are cylindrical. Thus, similar to the example shown in FIG. 2, area 120C, forming a contact between flange 112B and surface 119C of the first structural component 101B, is coated with the layer 118B of fresh sealant.

The diameter of shaft 109B of rivet 107B is larger than the diameter of the inner surface 114B of body 113B of sleeve 111B. The diameter of the outer surface 115B of body 113B of sleeve 111B is smaller than the diameter of drilled hole 103B, before inserting rivet 107B in sleeve 111B. Thus, fastening device 100B enables an interference fit within the structural components (101B and 102B).

Alternatively, head 108B rivet 107B is countersunk and/or locking part 121 is in the form of a thread able to accommodate a nut.

Ring 116B is positioned at radius 117B under the head of the sleeve 117A on the outer surface 115B of body 113B of sleeve 111B.

Such assemblies as displayed on FIGS. 1, 2 and 3 have the advantage of keeping the fresh sealant layer from flowing to the sleeve body's outer surface by means of the ring compressed between the body of the sleeve and the drilled hole, thus preventing the adhesion between the sleeve and drilled hole from being compromised.

The clearance that the ring (116, 116A and 116B) has to fill is very small and variable. Consequently, the ring preferably has a relatively large compressibility so as not to impede the proper fitting of the fastening device in the drilled hole and in particular so as not to limit the radial expansion of the sleeve in the drilled hole. The ring (116, 116A and 116B) also has good compressive strength, so as not to crack or become worn when the fastening device is tightened in the structural components.

One particular material that meets these constraints is acrylic polymer-based. The material may also comprise mica.

Tables 1 and 2 each show an example of a sealant composition particularly suitable for manufacturing the ring (116, 116A and 116B).

TABLE 1

| Components | CAS registry number | % |
|---|---|---|
| Acrylic polymer | — | 10-30 |
| Mica | 12001-26-2 | 5-10 |
| Titanium dioxide | 13463-67-7 | 1-5 |
| Acrylic polymer | 25212-88-8 | 1-5 |
| Quartz (SiO$_2$) | 14808-60-7 | 0.1-1 |
| Chloride 1-(3-Chloroallyl)-3,5,7-triaza-1-azonia-adamantane chloride | 4080-31-3 | 0.1-1 |

TABLE 2

| Components | CAS registry number | % |
|---|---|---|
| Acrylic polymer | — | 10-30 |
| Mica | 12001-26-2 | 5-10 |
| Di-iron trioxide | 1309-37-1 | 1-5 |
| Titanium dioxide | 13463-67-7 | 1-5 |
| Acrylic polymer | 25212-88-8 | 1-5 |
| 1,2-propanediol | 57-55-6 | 1-5 |
| Quartz (SiO$_2$) | 14808-60-7 | 0.1-1 |
| 1-(3-Chloroallyl)-3,5,7-triaza-1-azonia-adamantane chloride | 4080-31-3 | 0.1-1 |

The Vibra-Seal® 503 and Vibra-Seal® 516 compositions marketed by the company Loctite are examples of suitable compositions for the manufacture of the ring (116, 116A and 116B). These compositions are known in the fastener industry and applied to screw threads. Once polymerized, these compositions seal the threads of screw/nut type fasteners together, and limit or prevent the nuts from loosening, once they have been screwed into screw threads coated with one of these compositions.

The applicant has found that these compositions, once dry, have a porous consistence particularly suited to the problem that this invention aims to solve, unlike plastic or rubber seals which have limited compressibility and low compressive strength. Thus, once dry, the composition fits to shape defects and variations in volume by compressing without cracking or wearing down, and with very little creep, which does not compromise the integrity of the interference fit. The ring (116, 116A and 116B) for example is made by applying a bead of fresh sealant complying with the composition in Table 1 or Table 2 to the sleeve, then by performing polymerization at room temperature, or by curing to accelerate the polymerization process. Once the bead is polymerized, the fastener device can be fitted into the structural components.

One method for forming the assemblies described above is as follows.

First, the layer (118, 118A and 118B) of fresh sealant is applied to a part (105, 120 and 120C) of the first structural component (101, 101A and 101B) designed to accommodate the head (112, 112A and 112B) of the sleeve (111, 111A and 111B).

In the example shown in FIG. 1, the layer 118 is applied to countersink 105 of drilled hole 103.

In the examples shown in FIGS. 2 and 3, the layer (118A and 118B) is applied to the contact area (120 and 120C) between the flange (112A and 112B) of the sleeve (111A and 111B) and the surface (119 and 119C) of the first structural component (101A and 101B), when the sleeve (111A and 111B) is in place in the drilled hole (103A and 103B).

The rivet 107B or screw (107 and 107A) is then partially inserted into the sleeve (111, 111A and 111B). The term "partial insertion" means that the bolt or screw is inserted without force or with limited force in the sleeve. Thus, the partial insertion of the bolt or screw into the sleeve does not cause the sleeve to radially expand. Typically, when the screw or the rivet is partially inserted in the sleeve, the shaft (109, 109A and 109B) of the screw or rivet at least partly emerges from the sleeve. Similarly, the threaded part (110 and 110A) of the screw or the pull stem 122 of the rivet partly emerges from the sleeve.

Then, the fastening device (100, 100A and 100B) comprising the rivet 107B or screw (107 and 107A) partially inserted in the sleeve, is placed in the drilled hole (103, 103A and 103B) with a positive clearance, so that the head (112, 112A and 112B) of the sleeve (111, 111A and 111B) comes into contact with the layer (118, 118A and 118B) of fresh sealant. The ring (116, 116A and 116B) is slightly compressed between the cylindrical wall (106, 106A, 106B) of the drilled hole (103, 103A and 103B) and the outer surface (115, 115A, 115B) of the sleeve's body, thereby forming a barrier to the flowing of the layer (118, 118A and 118B) of fresh sealant towards the outer surface (115, 115A and 115B) of the body (113, 113A and 113B) of the sleeve (107, 107A and 107B).

In the examples shown in FIGS. 1 and 2, a nut (123 and 123A) is positioned on the threaded part (110 and 110A) of the screw (107 and 107A), then tightened resulting in a full insertion of the screw in the sleeve (111 and 111A). The screw is considered fully inserted when the head (108 and 108A) of the screw is in contact with the head (112 and 122A) of the sleeve. The insertion of the screw (107 and 107A) causes the radial expansion of the sleeve (111 and 111A) and final compression of the ring (116 and 116A).

In the example shown in FIG. 3, a tool is used to pull on the pull stem 122 in order to fully insert the rivet 107B into the sleeve 111B. The bolt is considered fully inserted when the head (108B) of the rivet is in contact with the head (112B) of the sleeve. The insertion of rivet 107B causes the radial expansion of sleeve 111B and the final compression of ring 116B. Depending on the type of rivet used, either a ring 123B is swaged on the locking part 121 and then pull stem 122 is broken, or the rivet is broken then ring 123B is swaged on the locking part 121. According to a variant in which the locking part 121 is threading, a nut is tightened onto the thread.

Finally, the last step is to let the assembly dry so that the sealant in the layer (118, 118A and 118B) solidifies to ensure that the assembly is sealed.

Such an assembly process has the advantage of preventing the layer (118, 118A and 118B) of fresh sealant from spreading inside the drilled hole, around the body (113, 113A and 113B) of the sleeve (111, 111A and 111B). In this manner, the adhesion between the sleeve (111, 111A and 111B) and the drilled hole (103, 103A and 103B) necessary for a high quality assembly of the fastening device (100, 100A and 100B) and structural components is ensured.

The invention claimed is:

1. A fastening device comprising:
   a bolt extending along an axis with a head and a shaft;
   a sleeve extending along the axis of the bolt and comprising a head able to house the head of the bolt and a body able to house the bolt shaft, the sleeve body having an inner diameter smaller than the bolt shaft diameter so as to provide a negative clearance between sleeve and shaft;
   a ring made of solid and compressible material, joined with an outer surface of the sleeve body and positioned near the sleeve head,
   said device being characterized by the fact that said outer surface has a first portion that is able to be in contact with a wall of a drilled bore made in a structural component, said ring being able to be compressed between a second portion of said outer surface and said wall; and
      wherein the ring is made of a material comprising an acrylic polymer.

2. A device according to claim 1, wherein the ring is made of a material comprising an acrylic polymer that is porous once dry.

3. A method for manufacturing a device according to claim 2, comprising a step in which a bead of polymer material, in liquid or viscous state, is applied to the outer surface of the sleeve, and then polymerized to solidify said material into a ring shape.

4. A method for assembling a fastening device according to claim 2 onto a structural component, said component comprising a drilled hole, said hole having a wall able to house the body of the sleeve with clearance, said method comprising the following steps:
   application of a layer of a viscous or liquid composition on a part of the structural component intended to come into contact with the head of the sleeve;
   insertion of the sleeve into the drilled hole of the structural component along the axis of the bolt so that the ring is compressed against the wall of the drilled hole;
   insertion of the bolt in the sleeve along the axis of the bolt so that the sleeve expands radially into the drilled hole and the ring is compressed between the wall and the outer surface of the sleeve body.

5. An assembly of a fastening device with a structural component, the said assembly originating from a method according to claim 4.

6. A device according to claim 1, wherein said material also comprises mica.

7. A device according to claim 1, wherein the ring is disposed around a radius under the sleeve head.

8. A device according to claim 1, wherein the bolt is a screw or a rivet comprising a pull stem.

9. A method for manufacturing a device according to claim 1, comprising a step in which a bead of polymer material, in liquid or viscous state, is applied to the outer surface of the sleeve, and then polymerized to solidify said material into a ring shape.

10. A method for assembling a fastening device according to claim 1 onto a structural component, said component comprising a drilled hole, said hole having a wall able to house the body of the sleeve with clearance, said method comprising the following steps:
    application of a layer of a viscous or liquid composition on a part of the structural component intended to come into contact with the head of the sleeve;
    insertion of the sleeve into the drilled hole of the structural component along the axis of the bolt, so that the ring is compressed against the wall of the drilled hole;
    insertion of the bolt in the sleeve along the axis of the bolt so that the sleeve expands radially into the drilled hole and the ring is compressed between the wall and the outer surface of the sleeve body.

11. An assembly of a fastening device with a structural component, the said assembly originating from a method according to claim 10.

* * * * *